US012701514B2

(12) United States Patent (10) Patent No.: US 12,701,514 B2
Yuan et al. (45) Date of Patent: Aug. 4, 2026

(54) UPLINK POWER CONTROL PARAMETER INDICATION SCHEMES

(71) Applicant: QUALCOMM Incorporated, San Diego, CA (US)

(72) Inventors: Fang Yuan, Beijing (CN); Yan Zhou, San Diego, CA (US); Tianyang Bai, Mountain View, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 18/551,091

(22) PCT Filed: May 10, 2021

(86) PCT No.: PCT/CN2021/092567
§ 371 (c)(1),
(2) Date: Sep. 18, 2023

(87) PCT Pub. No.: WO2022/236522
PCT Pub. Date: Nov. 17, 2022

(65) Prior Publication Data
US 2024/0172125 A1 May 23, 2024

(51) Int. Cl.
*H04W 52/14* (2009.01)
*H04W 52/32* (2009.01)
(52) U.S. Cl.
CPC ....... *H04W 52/146* (2013.01); *H04W 52/325* (2013.01)
(58) Field of Classification Search
CPC ... H04W 52/14; H04W 52/146; H04W 52/32; H04W 52/325
See application file for complete search history.

(56) References Cited

U.S. PATENT DOCUMENTS

| 11,051,181 | B2 * | 6/2021 | Yerramalli | ........... | H04B 7/0617 |
| 11,272,531 | B2 * | 3/2022 | Chen | ................... | H04B 1/7143 |

(Continued)

FOREIGN PATENT DOCUMENTS

| CN | 111093257 A | 5/2020 |
| CN | 111901020 A | 11/2020 |

(Continued)

OTHER PUBLICATIONS

International Search Report and Written Opinion—PCT/CN2021/092567—ISA/EPO—Feb. 14, 2022.

(Continued)

*Primary Examiner* — Hai V Nguyen
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink transmission configuration indicator (TCI) state or a joint TCI state. The UE may receive, from the base station, the one or more uplink power control parameters based at least in part on the indication of the uplink power control parameter indication scheme associated with the uplink channel or the reference signal. Numerous other aspects are described.

35 Claims, 7 Drawing Sheets

300

(56) References Cited

U.S. PATENT DOCUMENTS

| | | | | |
|---|---|---|---|---|
| 11,425,701 | B2 * | 8/2022 | Venugopal | H04W 72/21 |
| 11,546,859 | B2 * | 1/2023 | Ryu | H04W 24/10 |
| 11,558,159 | B2 * | 1/2023 | Manolakos | H04W 72/23 |
| 11,601,891 | B2 * | 3/2023 | Zacharias | H04W 52/146 |
| 11,683,762 | B2 * | 6/2023 | Bae | H04W 52/14 |
| | | | | 455/522 |
| 11,770,775 | B2 * | 9/2023 | Jung | H04W 72/0473 |
| | | | | 370/311 |
| 11,864,278 | B2 * | 1/2024 | Sun | H04W 72/21 |
| 11,916,832 | B2 * | 2/2024 | Go | H04W 52/06 |
| 11,943,774 | B2 * | 3/2024 | Wong | H04L 5/0053 |
| 11,974,230 | B2 * | 4/2024 | Bai | H04W 52/54 |
| 11,996,923 | B2 * | 5/2024 | Zhou | H04B 7/06964 |
| 12,004,220 | B2 * | 6/2024 | Xu | H04B 7/0426 |
| 12,009,895 | B2 * | 6/2024 | Zhou | H04B 7/063 |
| 12,119,897 | B2 * | 10/2024 | Go | H04B 7/06966 |
| 12,363,761 | B2 * | 7/2025 | Xu | H04W 74/0833 |
| 12,382,482 | B2 * | 8/2025 | Bai | H04W 72/535 |
| 12,445,970 | B2 * | 10/2025 | Matsumura | H04W 52/24 |
| 2019/0261280 | A1 * | 8/2019 | Jung | H04W 52/50 |
| 2019/0387418 | A1 * | 12/2019 | Yerramalli | H04B 7/0617 |
| 2021/0075571 | A1 * | 3/2021 | Manolakos | H04W 72/23 |
| 2021/0211988 | A1 * | 7/2021 | Jung | H04W 52/386 |
| 2021/0360701 | A1 * | 11/2021 | Xu | H04L 5/0048 |
| 2022/0166468 | A1 * | 5/2022 | Go | H04B 7/06956 |
| 2022/0174509 | A1 * | 6/2022 | Noh | H04W 56/001 |
| 2022/0330173 | A1 * | 10/2022 | Matsumura | H04L 5/0051 |
| 2022/0386327 | A1 * | 12/2022 | Bai | H04W 52/262 |
| 2023/0121938 | A1 * | 4/2023 | Zhou | H04B 7/06964 |
| | | | | 375/347 |
| 2023/0217372 | A1 * | 7/2023 | Bai | H04W 52/325 |
| | | | | 455/522 |
| 2023/0239096 | A1 * | 7/2023 | Go | H04L 5/0098 |
| | | | | 370/329 |
| 2024/0155503 | A1 * | 5/2024 | Wang | H04W 52/242 |
| 2024/0155652 | A1 * | 5/2024 | Noh | H04W 72/27 |
| 2024/0196229 | A1 * | 6/2024 | Noh | H04B 7/06966 |
| 2024/0224273 | A1 * | 7/2024 | Guo | H04W 52/146 |
| 2024/0306215 | A1 * | 9/2024 | Xu | H04B 17/327 |
| 2024/0414657 | A1 * | 12/2024 | Khoshnevisan | H04W 8/24 |
| 2025/0047444 | A1 * | 2/2025 | Zhang | H04L 5/0035 |
| 2025/0080299 | A1 * | 3/2025 | Bai | H04L 5/0023 |
| 2025/0096997 | A1 * | 3/2025 | Zhang | H04L 5/0091 |
| 2025/0212136 | A1 * | 6/2025 | Ling | H04W 52/08 |

FOREIGN PATENT DOCUMENTS

| | | | | |
|---|---|---|---|---|
| CN | 112399543 | A | 2/2021 | |
| EP | 4064766 | A1 | 9/2022 | |
| EP | 4096107 | A1 | 11/2022 | |
| EP | 4518216 | A1 * | 3/2025 | H04B 7/024 |
| WO | WO-2019159008 | A1 | 8/2019 | |
| WO | WO-2020144773 | A1 | 7/2020 | |
| WO | WO-2021198988 | A1 * | 10/2021 | H04L 1/08 |
| WO | WO-2022029691 | A1 * | 2/2022 | H04W 52/42 |
| WO | WO-2024035673 | A1 * | 2/2024 | H04W 88/02 |

OTHER PUBLICATIONS

OPPO: "Enhancements on Multi-Beam Operation", 3GPP TSG RAN WG1 #104b-e, R1-2102378, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, 20 Pages, XP052177095, sections 2.1, 2.4.

OPPO: "Enhancements on Multi-Beam Operation", 3GPP Tsg ran WG1 #104-e, R1-2100118, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, 25 Pages, XP051970240, sections 2.1, 2.3.

Supplementary European Search Report—EP21941102—Search Authority—The Hague—Dec. 18, 2024.

Lenovo, et al., "Enhancements on Multi-Beam Operation", R1-2102838, 3GPP TSG RAN WG1 #104b-e, e-Meeting, Apr. 12-20, 2021, Agenda Item: 8.1.1, Apr. 12, 2021, 16 Pages, Apr. 6, 2021.

OPPO: "Enhancements on Multi-Beam Operation", 3GPP TSG RAN WG1 #104b-e, R1-2102378, e-Meeting, Apr. 12-20, 2021, 20 Pages, Apr. 7, 2021.

OPPO: "Enhancements on Multi-Beam Operation", 3GPP TSG RAN WG1 #104-e, R1-2100118, e-Meeting, Jan. 25, 2021-Feb. 5, 2021, Jan. 18, 2021, 25 pages.

* cited by examiner

300

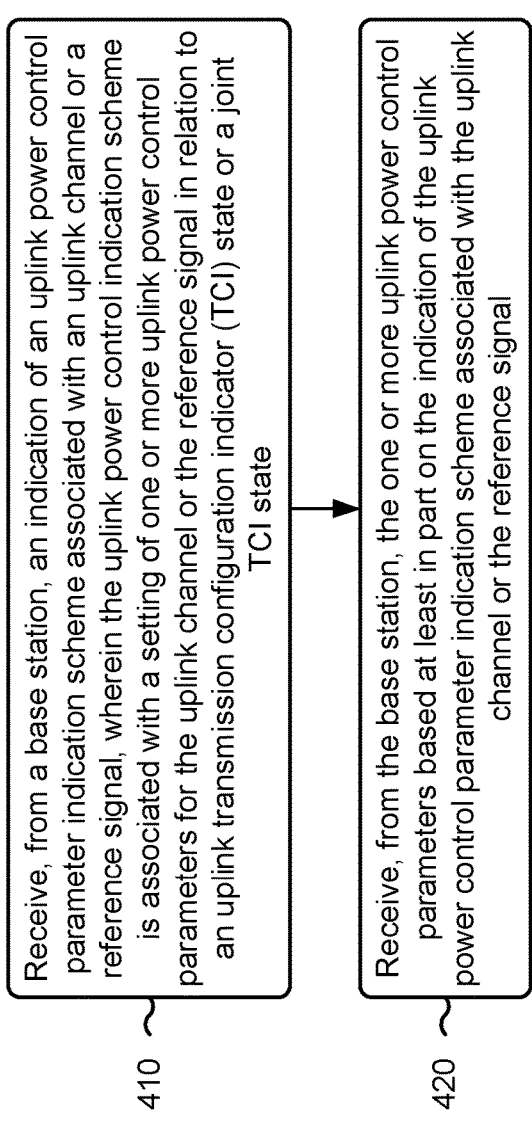

Receive, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink transmission configuration indicator (TCI) state or a joint TCI state

410

Receive, from the base station, the one or more uplink power control parameters based at least in part on the indication of the uplink power control parameter indication scheme associated with the uplink channel or the reference signal

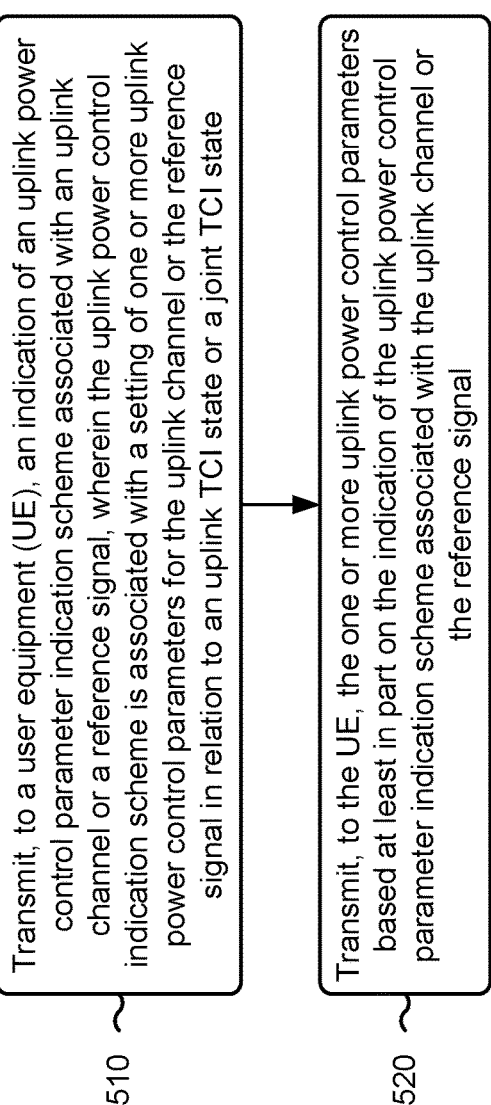

510 — Transmit, to a user equipment (UE), an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state 520 — Transmit, to the UE, the one or more uplink power control parameters based at least in part on the indication of the uplink power control parameter indication scheme associated with the uplink channel or the reference signal

UPLINK POWER CONTROL PARAMETER INDICATION SCHEMES

CROSS-REFERENCE TO RELATED APPLICATION

This Patent Application is a 371 national stage of PCT Application No. PCT/CN2021/092567 filed on May 10, 2021, entitled "UPLINK POWER CONTROL PARAMETER INDICATION SCHEMES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink power control parameter indication schemes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink transmission configuration indicator (TCI) state or a joint TCI state; and receive, from the base station, the one or more uplink power control parameters based at least in part on the indication of the uplink power control parameter indication scheme associated with the uplink channel or the reference signal.

In some aspects, a base station for wireless communication includes a memory and one or more processors, coupled to the memory, configured to: transmit, to a UE, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state: and transmit, to the UE, the one or more uplink power control parameters based at least in part on the indication of the uplink power control parameter indication scheme associated with the uplink channel or the reference signal.

In some aspects, a method of wireless communication performed by a UE includes receiving, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state; and receiving, from the base station, the one or more uplink power control parameters based at least in part on the indication of the uplink power control parameter indication scheme associated with the uplink channel or the reference signal.

In some aspects, a method of wireless communication performed by a base station includes transmitting, to a UE, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state; and transmitting, to the UE, the one or more uplink power control parameters based at least in part on the indication of the uplink power control parameter indication scheme associated with the uplink channel or the reference signal.

In some aspects, a non-transitory computer-readable medium storing a set of instructions for wireless communication includes one or more instructions that, when executed by one or more processors of a UE, cause the UE to: receive, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state: and receive, from the base station, the one or more uplink power control parameters based at least in part on the indication of the uplink power control parameter indication scheme associated with the uplink channel or the reference signal.

In some aspects, a non-transitory computer-readable medium storing a set of instructions for wireless communication includes one or more instructions that, when executed by one or more processors of a base station, cause the base station to: transmit, to a UE, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state; and transmit, to the UE, the one or more uplink power control parameters based at least in part on the indication of the uplink power control param- eter indication scheme associated with the uplink channel or the reference signal.

In some aspects, an apparatus for wireless communication includes means for receiving, from a base station, an indi- cation of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state; and means for receiving, from the base station, the one or more uplink power control parameters based at least in part on the indication of the uplink power control parameter indication scheme associated with the uplink channel or the reference signal.

In some aspects, an apparatus for wireless communication includes means for transmitting, to a UE, an indication of an uplink power control parameter indication scheme associ- ated with an uplink channel or a reference signal, wherein the uplink power control indication scheme is associated with a setting of one or more uplink power control param- eters for the uplink channel or the reference signal in relation to an uplink TCI state or a joint TCI state: and means for transmitting, to the UE, the one or more uplink power control parameters based at least in part on the indication of the uplink power control parameter indication scheme asso- ciated with the uplink channel or the reference signal.

Aspects generally include a method, apparatus, system, computer program product, non-transitory computer-read- able medium, user equipment, base station, wireless com- munication device, and/or processing system as substan- tially described herein with reference to and as illustrated by the drawings and specification.

The foregoing has outlined rather broadly the features and technical advantages of examples according to the disclo- sure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrange- ments. For example, some aspects may be implemented via integrated chip embodiments or other non-module-compo- nent based devices (e.g., end-user devices, vehicles, com- munication devices, computing devices, industrial equip- ment, retail/purchasing devices, medical devices, or artificial intelligence-enabled devices). Aspects may be implemented in chip-level components, modular components, non-modu- lar components, non-chip-level components, device-level components, or system-level components. Devices incorpo- rating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this dis- closure and are therefore not to be considered limiting of its scope, for the description may admit to other equally effec- tive aspects. The same reference numbers in different draw- ings may identify the same or similar elements.

FIGS. 4-5 are diagrams illustrating example processes associated with uplink power control parameter indication schemes, in accordance with the present disclosure.

DETAILED DESCRIPTION

Various aspects of the disclosure are described more fully hereinafter with reference to the accompanying drawings. This disclosure may, however, be embodied in many differ- ent forms and should not be construed as limited to any specific structure or function presented throughout this dis- closure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
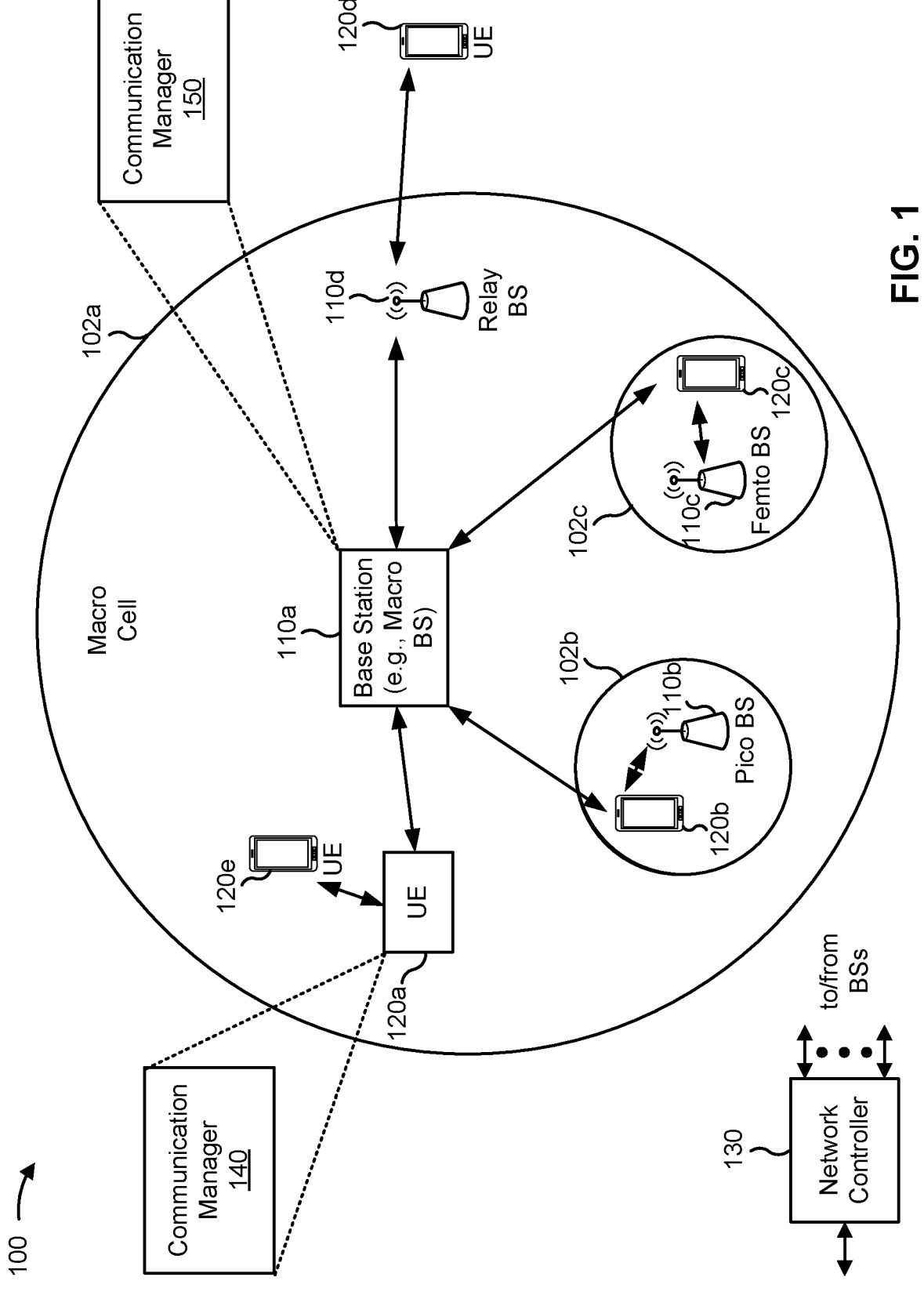
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE (e.g., UE 120) may include a communication manager 140. As described in more detail elsewhere herein, the communication manager 140 may receive, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state: and receive, from the base station, the one or more uplink power control parameters based at least in part on the indication of the uplink power control parameter indication scheme associated with the uplink channel or the reference signal. Additionally, or alternatively, the communication manager 140 may perform one or more other operations described herein.

In some aspects, a base station (e.g., base station 110) may include a communication manager 150. As described in more detail elsewhere herein, the communication manager 150 may transmit, to a UE, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state; and transmit, to the UE, the one or more uplink power control parameters based at least in part on the indication of the uplink power control parameter indication scheme associated with the uplink channel or the reference signal. Additionally, or alternatively, the communication manager 150 may perform one or more other operations described herein.

As indicated above, FIG. 1 is provided as an example. Other examples may differ from what is described with regard to FIG. 1.

Figure 2:
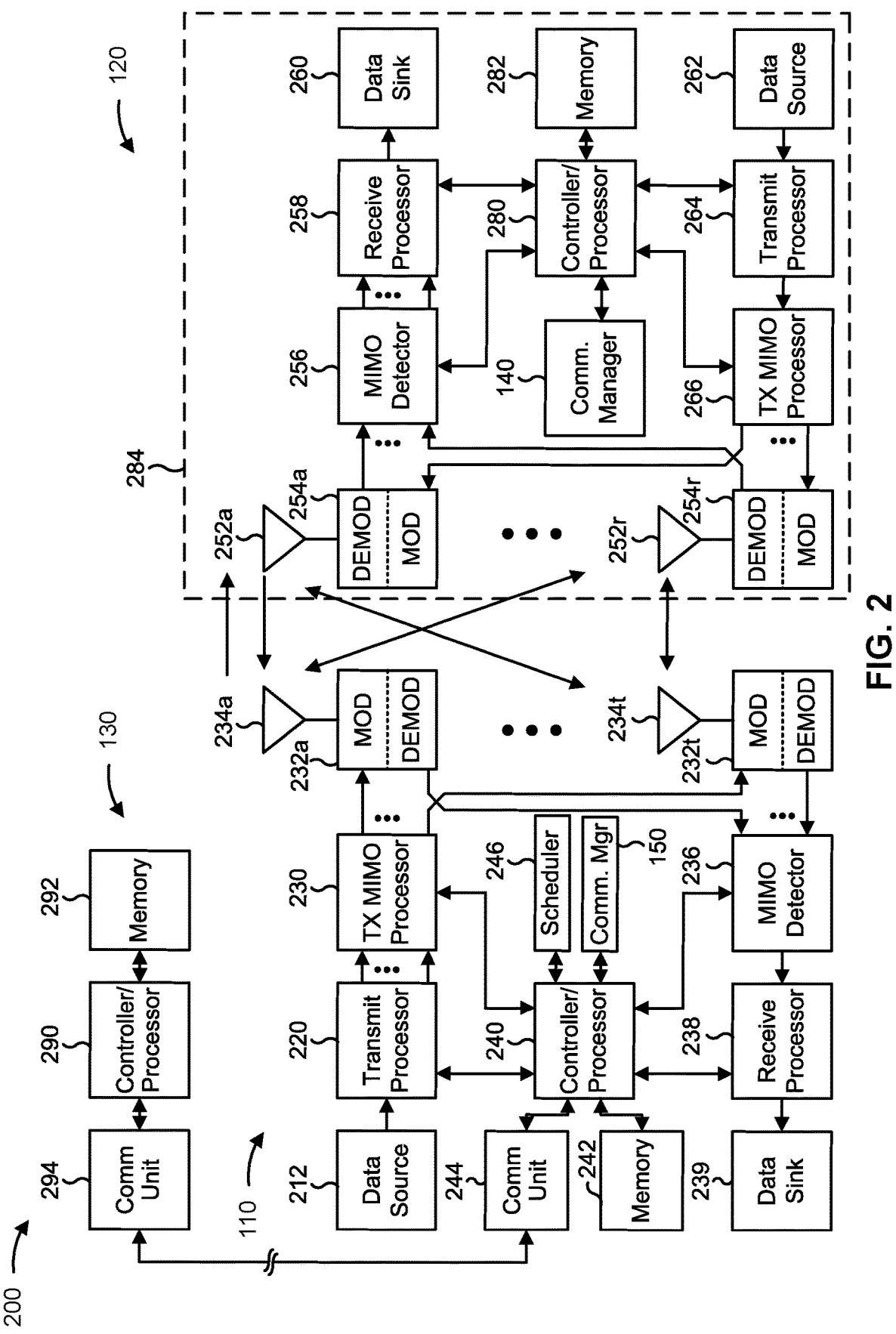
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE

120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with uplink power control parameter indication schemes, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, a UE (e.g., UE 120) includes means for receiving, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state; and/or means for receiving, from the base station, the one or more uplink power control parameters based at least in part on the indication of the uplink power control parameter indication scheme associated with the uplink channel or the reference signal. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a base station (e.g., base station 110) includes means for transmitting, to a UE, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state; and/or means for transmitting, to the UE, the one or more uplink power control parameters based at least in part on the indication of the uplink power control parameter indication scheme associated with the uplink channel or the reference signal. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Uplink power control may determine a transmit power for physical uplink shared channel (PUSCH) transmissions, physical uplink control channel (PUCCH) transmissions, and sounding reference signal (SRS) transmissions. Uplink power control may be based at least in part on one or more uplink power control parameters. The uplink power control parameters may include a $P_0$ value, an alpha value, and a closed loop index. The $P_0$ value may be associated with controlling a received power level. The alpha value may be associated with a partial pathloss compensation. The closed loop index (I) may be associated with a loop of transmit power control (TPC) commands, where a closed loop power control may be based at least in part on the TPC commands. The uplink power control parameters (e.g., the $P_0$ value, the alpha value, and the closed loop index)may be set for each of a PUSCH, a PUCCH, and an SRS.

As an example, a setting of the uplink power control parameters may be associated with an uplink TCI state or a joint TCI state (or common TCI state). The joint TCI state may or may not be applicable. The joint TCI state may be associated with an uplink TCI state and/or a downlink TCI state. Each TCI state (e.g., uplink TCI state or joint TCI state) may indicate parameters and/or quasi-colocation (QCL) relationships associated with resources of reference signals. A base station may configure the uplink TCI state or the joint TCI state for a UE. The uplink TCI state or joint TCI state may be applied to one or more of uplink channels. As another example, the setting of the uplink power control parameters may be included with (or indicated in) the uplink TCI state or the joint TCI state. As yet another example, the setting of the uplink power control parameters may be neither associated with nor included in the uplink TCI state or the joint TCI state. Further, the setting of the uplink power control parameters may be associated with an uplink channel or an uplink reference signal, such that the setting may be channel-specific or signal-specific. The association between a setting of the uplink power control parameters and an uplink channel or an uplink reference signal may be indicated by radio resource control (RRC) signaling or medium access control control element (MAC-CE) signaling.

In some cases, the uplink power control parameters may also include a PL-RS. As an example, the PL-RS may be included in an uplink TCI state or a joint TCI state. When the PL-RS is not included in the uplink TCI state or the joint TCI state, the PL-RS may be a periodic downlink reference signal used as a source reference signal for determining a spatial transmit filter, or the PL-RS may be used for an uplink reference signal in the uplink TCI state or the joint TCI state.

As another example, the PL-RS may be associated with but not included in the uplink TCI state or the joint TCI state. When the PL-RS is not associated with the uplink TCI state or the joint TCI state, the PL-RS may be a periodic downlink reference signal used as a source reference signal for determining a spatial transmit filter, or the PL-RS may be used for an uplink reference signal in the uplink TCI state or the joint TCI state. The spatial transmit filter may be associated with a shape and a direction of a beam used for transmitting data.

As yet another example, the UE may determine a pathloss based at least in part on a periodic downlink reference signal configured as a source reference signal for determining a spatial transmit filter in the uplink TCI state or the joint TCI state. When a PL-RS is not included in or associated with the uplink TCI state or the joint TCI state, the UE may estimate the pathloss based at least in part on a PL-RS of an uplink reference signal provided in the uplink TCI state or the TCI state, where the uplink reference signal may be provided as the source reference signal for determining the spatial transmit filter.

In some cases, indications of uplink power control parameters (e.g., the $P_0$ value, the alpha value, the closed loop index, and the PL-RS) may not be unified together with a unified TCI, which may be associated with an uplink TCI state and/or a downlink TCI state. The unified TCI may be applied to multiple channel types, and different channel types may have different power control parameter settings. In this case, the indications of uplink power control parameters may not be unified together with the unified TCI state because multiple channel types with different power control parameter settings may be applicable for the unified TCI.

In various aspects of techniques and apparatuses described herein, a UE may receive, from a base station, an indication of an uplink power control parameter indication scheme associated with an uplink channel or a reference signal, such as a PUCCH, a PUSCH, or an SRS. The uplink power control indication scheme may be associated with a setting of one or more uplink power control parameters for the uplink channel or the reference signal in relation to an uplink TCI state or a joint TCI state. Different uplink power control parameter indication schemes may be associated with different uplink channels or reference signals, such as the PUCCH, the PUSCH, or the SRS, as opposed to having a unified uplink power control parameter indication together with a unified TCI, where different uplink channels applied with the unified TCI may have a same setting of uplink power control parameters. Depending on the uplink channel or the reference signal (e.g., PUCCH, PUSCH, or SRS), the setting of one or more uplink power control parameters may be associated with the uplink TCI state or the joint TCI state, included with the uplink TCI state or the joint TCI state, or neither associated with nor included with the uplink TCI state or the joint TCI state. The UE may receive, from the base station, the one or more uplink power control parameters based at least in part on the indication of the uplink power control parameter indication scheme associated with the uplink channel or the reference signal.

Figure 3:
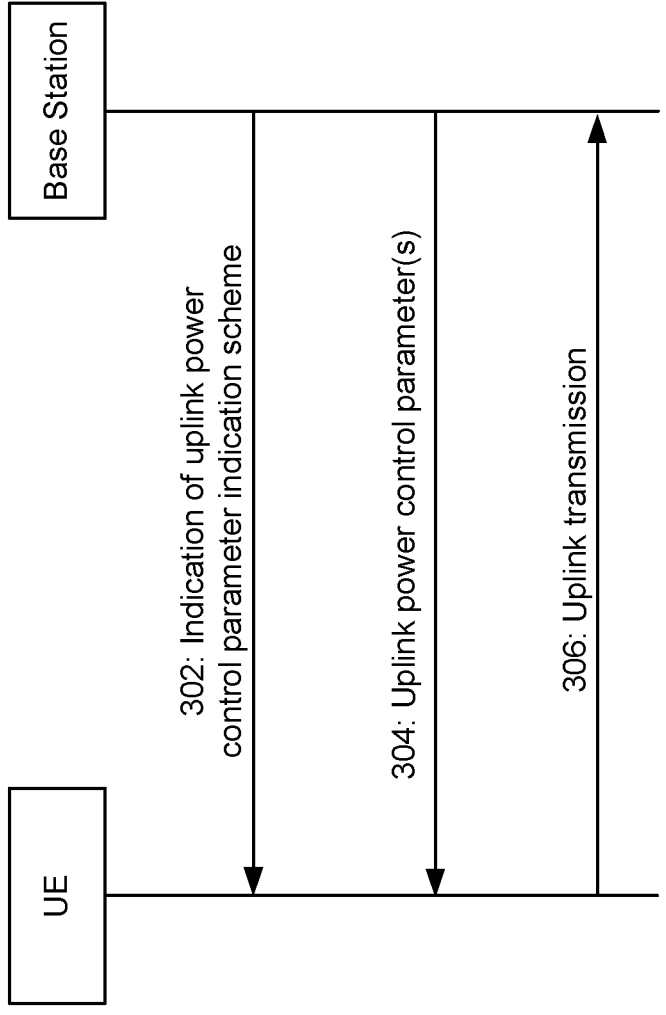
FIG. 3 is a diagram illustrating an example associated with uplink power control parameter indication schemes, in accordance with the present disclosure.

FIG. 3 is a diagram illustrating an example 300 associated with uplink power control parameter indication schemes, in accordance with the present disclosure. As shown in FIG. 3, example 300 includes communication between a transmitting node (e.g., base station 110) and a receiving node (e.g., UE 120). In some aspects, the transmitting node and the receiving node may be included in a wireless network such as wireless network 100.

As shown by reference number 302, the UE may receive, from the base station, an indication of an uplink power control parameter indication scheme associated with an uplink channel or a reference signal. The uplink power control indication scheme may be associated with a setting of one or more uplink power control parameters for the uplink channel or the reference signal in relation to an uplink TCI state or a joint TCI state.

In some aspects, different uplink power control parameter indication schemes may be associated with different channels. Uplink power control parameters may include a $P_0$ value, an alpha value, and closed loop index. The $P_0$ value may be associated with a received power level, the alpha value may be associated with a partial pathloss compensation, and the closed loop index may be associated with a transmit power control command. The uplink power control parameters may also include a PL-RS.

In some aspects, for a PUCCH/PUSCH, a setting of uplink power control parameters (e.g., a $P_0$ value, an alpha value, and a closed loop index) may be associated with or included with an uplink TCI state or a joint TCI state. In some aspects, for the PUCCH/PUSCH, the setting of uplink power control parameters (e.g., a PL-RS) may be associated with or included with the uplink TCI state or a joint TCI state.

In some aspects, for an SRS resource set, the setting of uplink power control parameters (e.g., a $P_0$ value, an alpha value, and a closed loop index) may be configured per SRS resource set, but may not be associated with or included with the uplink TCI state or the joint TCI state for each SRS in the SRS resource set. In some aspects, for the SRS resource set, the setting of uplink power control parameters (e.g., a PL-RS) may be configured per SRS resource set, but may not be associated with or included with the uplink TCI state or the joint TCI state for each SRS in the SRS resource set.

In some aspects, for an SRS resource, the setting of uplink power control parameters (e.g., a $P_0$ value, an alpha value, and a closed loop index) may be associated with or included with the uplink TCI state or the joint TCI state. In some aspects, for the SRS resource, the setting of uplink power control parameters (e.g., a PL-RS) may be associated with or included with the uplink TCI state or the joint TCI state.

Power control parameter sets associated with TCIs for different SRS resources per SRS resource set may be a same uplink power control parameter set (e.g., the power control parameter sets may be identical to each other). Alternatively, a power control parameter set may be only configured for a single TCI of a single SRS resource per SRS resource set, and other SRS resources may also use the power control parameter set that is configured. For example, a power control parameter set may be only associated with or included in a TCI of a first SRS resource in an SRS resource set, and other SRS resources in the SRS resource set may also use the power control parameter set for the first SRS resource.

In some aspects, the base station may configure each uplink channel, such as the PUCCH, the PUSCH, and the SRS, to apply one of the uplink power control parameter indication schemes. The uplink power control parameter indication schemes may be associated with a $P_0$ value, an alpha value, and a closed loop index, or the uplink power control parameter indication schemes may be associated with a PL-RS.

In some aspects, the base station may transmit a radio resource control (RRC) configuration or MAC-CE signaling to indicate to the UE which uplink power control parameter indication scheme to apply for the given channel. The uplink power control parameter indication scheme may be associated with the $P_0$ value, the alpha value, and the closed loop index, or the uplink power control parameter indication scheme may be associated with the PL-RS.

In some aspects, the RRC configuration or MAC-CE signaling may indicate, for the PUCCH/PUSCH, that the setting of the $P_0$ value, the alpha value, and the closed loop index may be associated with or included with the uplink TCI state or the joint TCI state. The RRC configuration or MAC-CE signaling may indicate, for the SRS resource set, that the setting of the $P_0$ value, the alpha value, and the closed loop index may be configured per SRS resource set, but may not be associated with or included with the uplink TCI state or the joint TCI state for each SRS in the SRS resource set. The RRC configuration or MAC-CE signaling may indicate, for the SRS resource, that the setting of the $P_0$ value, the alpha value, and the closed loop index may be associated with or included with the uplink TCI state or the joint TCI state. In other words, RRC configurations or MAC-CE signaling may indicate uplink power control indication schemes for each uplink channel or reference signal.

In some aspects, the RRC configuration or MAC-CE signaling may indicate, for the PUCCH/PUSCH, that the setting of the PL-RS may be associated with or included with the uplink TCI state or the joint TCI state. The RRC configuration or MAC-CE signaling may indicate, for the SRS resource set, that the setting of the PL-RS may be configured per SRS resource set, but may not be associated with or included with the uplink TCI state or the joint TCI state for each SRS in the SRS resource set. The RRC configuration or MAC-CE signaling may indicate, for the SRS resource, that the setting of the PL-RS may be associated with or included with the uplink TCI state or the joint TCI state. In other words, RRC configurations or MAC-CE signaling may indicate uplink power control indication schemes for each uplink channel or reference signal.

In some aspects, the UE may report a UE capability message to the base station. The UE capability message may indicate a support of uplink power control parameter indication schemes for different uplink channels or reference signals (e.g., the PUCCH, the PUSCH, and the SRS). In some aspects, the indication of the uplink power control parameter indication scheme received from the base station may be based at least in part on the capability report.

In some aspects, the UE capability message may indicate that the UE supports the setting of uplink power control parameters (e.g., a $P_0$ value, an alpha value, and a closed loop index) being included with the uplink TCI state or the joint TCI state. The UE capability message may indicate that the UE supports the setting of uplink power control parameters (e.g., a $P_0$ value, an alpha value, and a closed loop index) being associated with the uplink TCI state or the joint TCI state. The UE capability message may indicate that the UE supports the setting of uplink power control parameters (e.g., a $P_0$ value, an alpha value, and a closed loop index) being neither associated with nor included in the uplink TCI state or the joint TCI state.

In some aspects, the UE capability message may indicate that the UE supports the setting of uplink power control parameters (e.g., a PL-RS) being included with the uplink TCI state or the joint TCI state. The UE capability message may indicate that the UE supports the setting of uplink power control parameters (e.g., a PL-RS) being associated with the uplink TCI state or the joint TCI state. The UE capability message may indicate that the UE supports the setting of uplink power control parameters (e.g., a PL-RS) being neither associated with nor included in the uplink TCI state or the joint TCI state.

In some aspects, the UE may report the UE capability message per channel type. For example, the UE may report the UE capability message for the PUCCH, the PUSCH, and the SRS, where the UE capability message may indicate that the UE supports different settings of the uplink power control parameter indications for the PUCCH, the PUSCH, and the SRS.

In some aspects, the UE may report the support for one or more of the uplink power control parameter indication schemes, and the base station may indicate to the UE which uplink power control parameter indication scheme to apply for a given channel.

In some aspects, when the UE is not explicitly configured or enabled with the setting of uplink power control parameters (e.g., a $P_0$ value, an alpha value, and a closed loop index) to be associated with or included with the uplink TCI state or the joint TCI state, the UE may infer that the setting of the uplink power control parameters is neither associated with nor included with the uplink TCI state or the joint TCI state.

In some aspects, the UE may calculate a pathloss based at least in part on a periodic downlink reference signal. The periodic downlink reference signal may be configured as a source reference signal for determining a spatial transmit filter in the uplink TCI state or the joint TCI state. The UE may calculate the pathloss based at least in part on the periodic downlink reference signal when the UE is not configured or enabled to have a PL-RS included in or associated with the uplink TCI state or the joint TCI state.

In some aspects, when the UE calculates the pathloss based at least in part on the periodic downlink reference signal configured as the source reference signal for determining the spatial transmit filter in the uplink TCI state or the joint TCI state, the UE may expect a QCL reference signal to be periodic. When the QCL reference signal is not periodic, the UE may expect to have a PL-RS included in or associated with (e.g., always included in or associated with) the uplink TCI state or the joint TCI state. Alternatively, when the QCL reference signal in the uplink TCI state or the joint TCI state is not periodic, the UE may expect at least one QCL source reference signal to be periodic in a QCL chain, and the UE may use an immediate parent source reference signal that is periodic.

As shown by reference number 304, the UE may receive, from the base station, one or more uplink power control parameters based at least in part on the indication of the uplink power control parameter indication scheme associated with the uplink channel or the reference signal. In some aspects, for the PUCCH/PUSCH, the one or more uplink power control parameters received from the base station may be associated with or included with the uplink TCI state or the joint TCI state. In some aspects, for the SRS resource set, the one or more uplink power control parameters received from the base station may be configured per SRS resource set, but not associated with or included with the uplink TCI state or the joint TCI state. In some aspects, for the SRS resource, the one or more uplink power control parameters received from the base station may be associated with or included with the uplink TCI state or the joint TCI state.

As shown by reference number 306, the UE may perform an uplink transmission to the base station based at least in part on the one or more uplink power control parameters. For example, the UE may perform the uplink transmission based at least in part on the $P_0$ value associated with the received power level, the alpha value associated with the partial pathloss compensation, the closed loop index associated with the transmit power control command, and/or the PL-RS.

As indicated above, FIG. 3 is provided as an example. Other examples may differ from what is described with regard to FIG. 3.

FIG. 4 is a diagram illustrating an example process 400 performed, for example, by a UE, in accordance with the present disclosure. Example process 400 is an example where the UE (e.g., UE 120) performs operations associated with uplink power control parameter indication schemes.

As shown in FIG. 4, in some aspects, process 400 may include receiving, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state (block 410). For example, the UE (e.g., using communication manager 140 and/or reception component 602, depicted in FIG. 6) may receive, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state, as described above.

As further shown in FIG. 4, in some aspects, process 400 may include receiving, from the base station, the one or more uplink power control parameters based at least in part on the indication of the uplink power control parameter indication scheme associated with the uplink channel or the reference signal (block 420). For example, the UE (e.g., using communication manager 140 and/or reception component 602, depicted in FIG. 6) may receive, from the base station, the one or more uplink power control parameters based at least in part on the indication of the uplink power control parameter indication scheme associated with the uplink channel or the reference signal, as described above.

Process 400 may include additional aspects, such as any single aspect or any combination of aspects described below and/or in connection with one or more other processes described elsewhere herein.

In a first aspect, the one or more uplink power control parameters include a $P_0$ value associated with a received power level, an alpha value associated with a partial pathloss compensation, and a closed loop index associated with a TPC command.

In a second aspect, alone or in combination with the first aspect, the one or more uplink power control parameters include a PL-RS.

In a third aspect, alone or in combination with one or more of the first and second aspects, the setting of the one or more uplink power control parameters is associated with or included with the uplink TCI state or the joint TCI state, wherein the uplink channel is a PUCCH or a PUSCH.

In a fourth aspect, alone or in combination with one or more of the first through third aspects, the reference signal is an SRS, and the setting of the one or more uplink power control parameters is configured per SRS resource set and is not associated with or included with the uplink TCI state or the joint TCI state for each SRS in an SRS resource set.

In a fifth aspect, alone or in combination with one or more of the first through fourth aspects, the reference signal is an SRS, and the setting of the one or more uplink power control parameters is associated with or included with the uplink TCI state or the joint TCI state for an SRS resource.

In a sixth aspect, alone or in combination with one or more of the first through fifth aspects, uplink power control parameter sets associated with different TCIs for different SRS resources per SRS resource set are a same uplink power control parameter set.

In a seventh aspect, alone or in combination with one or more of the first through sixth aspects, an uplink power control parameter set is configured for a single TCI of a single SRS resource per SRS resource set, and other SRS resources are associated with the uplink power control parameter set.

In an eighth aspect, alone or in combination with one or more of the first through seventh aspects, process 400 includes transmitting, to the base station, a capability report that indicates a support of uplink power control parameter indication schemes for different uplink channels or reference signals, wherein the uplink channels include a PUCCH or a PUSCH and the reference signals include an SRS, and wherein the indication of the uplink power control parameter indication scheme received from the base station is based at least in part on the capability report.

In a ninth aspect, alone or in combination with one or more of the first through eighth aspects, the capability report indicates that the UE supports the setting of the one or more uplink power control parameters being included with the uplink TCI state or the joint TCI state, the UE supports the setting of the one or more uplink power control parameters being associated with the uplink TCI state or the joint TCI state, or the UE supports the setting of the one or more uplink power control parameters neither being associated with nor included with the uplink TCI state or the joint TCI state, and the one or more uplink power control parameters include a $P_0$ value associated with a received power level, an alpha value associated with a partial pathloss compensation, and a closed loop index associated with a TPC command.

In a tenth aspect, alone or in combination with one or more of the first through ninth aspects, the capability report indicates that the UE supports the setting of the one or more uplink power control parameters being included with the uplink TCI state or the joint TCI state, the UE supports the setting of the one or more uplink power control parameters being associated with the uplink TCI state or the joint TCI state, or the UE supports the setting of the one or more uplink power control parameters neither being associated with nor included with the uplink TCI state or the joint TCI state, and the one or more uplink power control parameters include a PL-RS.

In an eleventh aspect, alone or in combination with one or more of the first through tenth aspects, the indication of the uplink power control parameter indication scheme is received from the base station in an RRC configuration, wherein the RRC configuration indicates respective uplink power control parameter indication schemes for each of a plurality of uplink channels or reference signals.

In a twelfth aspect, alone or in combination with one or more of the first through eleventh aspects, the setting of the one or more uplink power control parameters is neither associated with nor included with the uplink TCI state or the joint TCI state when the UE is not configured or enabled with the setting of the one or more uplink power control parameters to be associated with or included with the uplink TCI state or the joint TCI state.

In a thirteenth aspect, alone or in combination with one or more of the first through twelfth aspects, process 400 includes calculating a pathloss based at least in part on a periodic downlink reference signal configured as a source reference signal for determining a spatial transmit filter in the uplink TCI state or the joint TCI state, wherein the setting of the one or more uplink power control parameters does not configure or enable the UE to have a PL-RS associated with or included with the uplink TCI state or the joint TCI state.

In a fourteenth aspect, alone or in combination with one or more of the first through thirteenth aspects, a QCL reference signal is periodic when the pathloss is calculated based at least in part on the periodic downlink reference signal.

In a fifteenth aspect, alone or in combination with one or more of the first through fourteenth aspects, a QCL reference signal is not periodic when the pathloss is calculated based at least in part on the periodic downlink reference signal, wherein a pathloss reference signal is associated with or included with the uplink TCI state or the joint TCI state, or wherein at least one QCL reference signal is periodic in a QCL chain and the UE uses an immediate parent source reference signal that is periodic.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a base station, in accordance with the present disclosure. Example process 500 is an example where the base station (e.g., base station 110) performs operations associated with uplink power control parameter indication schemes.

As shown in FIG. 5, in some aspects, process 500 may include transmitting, to a UE, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state (block 510). For example, the base station (e.g., using communication manager 150 and/or transmission component 704, depicted in FIG. 7) may transmit, to a UE, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state, as described above.

As further shown in FIG. 5, in some aspects, process 500 may include transmitting, to the UE, the one or more uplink power control parameters based at least in part on the indication of the uplink power control parameter indication scheme associated with the uplink channel or the reference signal (block 520). For example, the base station (e.g., using communication manager 150 and/or transmission component 704, depicted in FIG. 7) may transmit, to the UE, the one or more uplink power control parameters based at least in part on the indication of the uplink power control parameter indication scheme associated with the uplink channel or the reference signal, as described above.

Process 500 may include additional aspects, such as any single aspect or any combination of aspects described below and/or in connection with one or more other processes described elsewhere herein.

In a first aspect, the one or more uplink power control parameters include a $P_0$ value associated with a received power level, an alpha value associated with a partial pathloss compensation, and a closed loop index associated with a TPC command.

In a second aspect, alone or in combination with the first aspect, the one or more uplink power control parameters include a PL-RS.

In a third aspect, alone or in combination with one or more of the first and second aspects, the setting of the one or more uplink power control parameters is associated with or included with the uplink TCI state or the joint TCI state, wherein the uplink channel is a PUCCH or a PUSCH.

In a fourth aspect, alone or in combination with one or more of the first through third aspects, the reference signal is an SRS, and the setting of the one or more uplink power control parameters is configured per SRS resource set and is not associated with or included with the uplink TCI state or the joint TCI state for each SRS in an SRS resource set.

In a fifth aspect, alone or in combination with one or more of the first through fourth aspects, the reference signal is an SRS, and the setting of the one or more uplink power control parameters is associated with or included with the uplink TCI state or the joint TCI state for an SRS resource.

In a sixth aspect, alone or in combination with one or more of the first through fifth aspects, uplink power control parameter sets associated with different TCIs for different SRS resources per SRS resource set are a same uplink power control parameter set.

In a seventh aspect, alone or in combination with one or more of the first through sixth aspects, an uplink power control parameter set is configured for a single TCI of a single SRS resource per SRS resource set, and other SRS resources are associated with the uplink power control parameter set.

In an eighth aspect, alone or in combination with one or more of the first through seventh aspects, process 500 includes receiving, from the UE, a capability report that indicates a support of uplink power control parameter indication schemes for different uplink channels or reference signals, wherein the uplink channels include a PUCCH or a PUSCH and the reference signals include an SRS, and wherein the indication of the uplink power control parameter indication scheme received from the base station is based at least in part on the capability report.

In a ninth aspect, alone or in combination with one or more of the first through eighth aspects, the capability report indicates that the UE supports the setting of the one or more uplink power control parameters being included with the uplink TCI state or the joint TCI state, the UE supports the setting of the one or more uplink power control parameters being associated with the uplink TCI state or the joint TCI state, or the UE supports the setting of the one or more uplink power control parameters neither being associated with nor included with the uplink TCI state or the joint TCI state, and the one or more uplink power control parameters include a $P_0$ value associated with a received power level, an alpha value associated with a partial pathloss compensation, and a closed loop index associated with a TPC command.

In a tenth aspect, alone or in combination with one or more of the first through ninth aspects, the capability report indicates that the UE supports the setting of the one or more uplink power control parameters being included with the uplink TCI state or the joint TCI state, the UE supports the setting of the one or more uplink power control parameters being associated with the uplink TCI state or the joint TCI state, or the UE supports the setting of the one or more uplink power control parameters neither being associated with nor included with the uplink TCI state or the joint TCI state, and the one or more uplink power control parameters include a PL-RS.

In an eleventh aspect, alone or in combination with one or more of the first through tenth aspects, the indication of the uplink power control parameter indication scheme is received from the base station in an RRC configuration, wherein the RRC configuration indicates respective uplink power control parameter indication schemes for each of a plurality of uplink channels or reference signals.

In a twelfth aspect, alone or in combination with one or more of the first through eleventh aspects, the setting of the one or more uplink power control parameters is neither associated with nor included with the uplink TCI state or the joint TCI state when the UE is not configured or enabled with the setting of the one or more uplink power control parameters to be associated with or included with the uplink TCI state or the joint TCI state.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
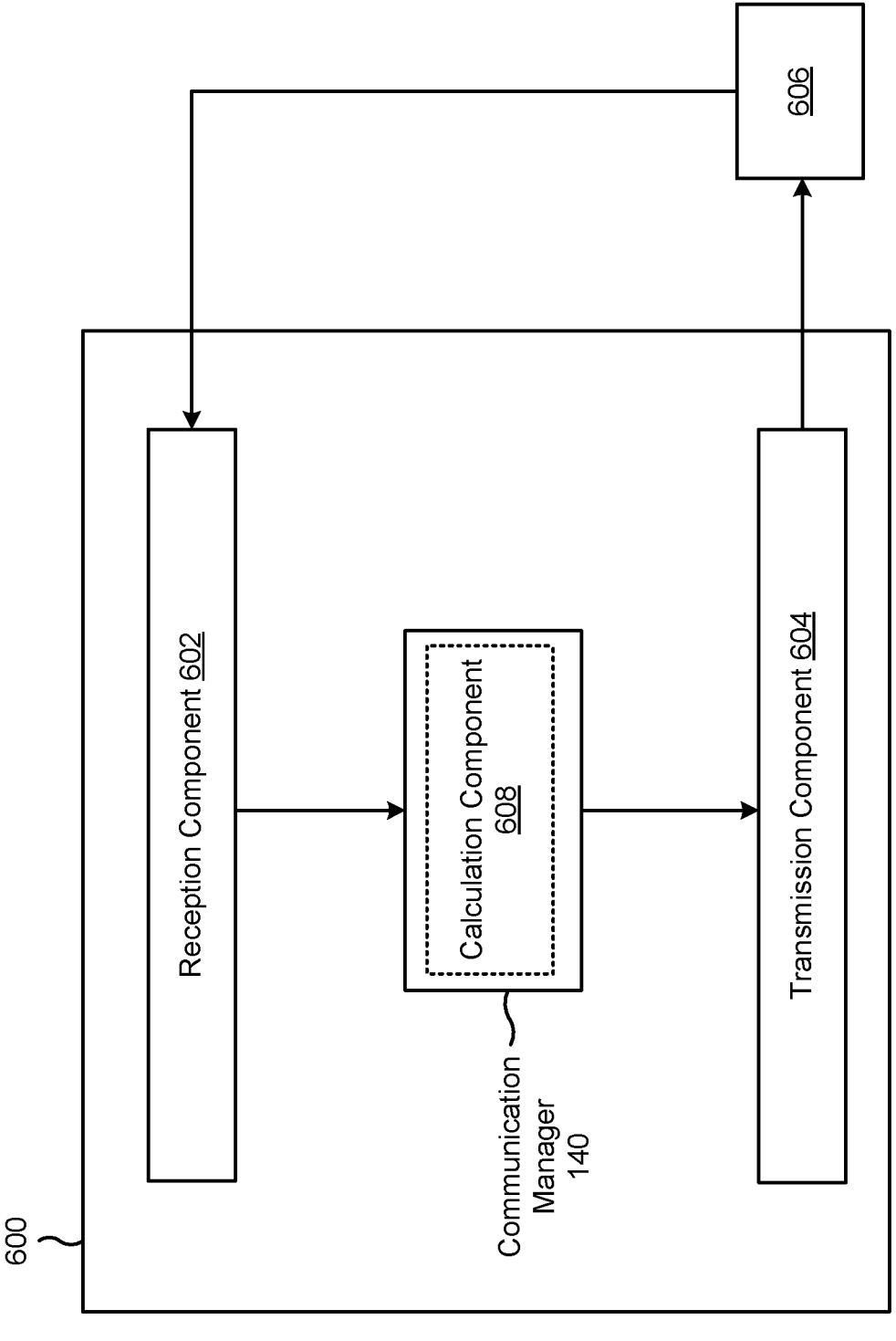
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include a calculation component 608, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state. The reception component 602 may receive, from the base station, the one or more uplink power control parameters based at least in part on the indication of the uplink power control parameter indication scheme associated with the uplink channel or the reference signal.

The transmission component 604 may transmit, to the base station, a capability report that indicates a support of uplink power control parameter indication schemes for different uplink channels or reference signals. The calculation component 608 may calculate a pathloss based at least in part on a periodic downlink reference signal configured as a source reference signal for determining a spatial transmit filter in the uplink TCI state or the joint TCI state, wherein the setting of the one or more uplink power control parameters does not configure or enable the UE to have a pathloss reference signal associated with or included with the uplink TCI state or the joint TCI state.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
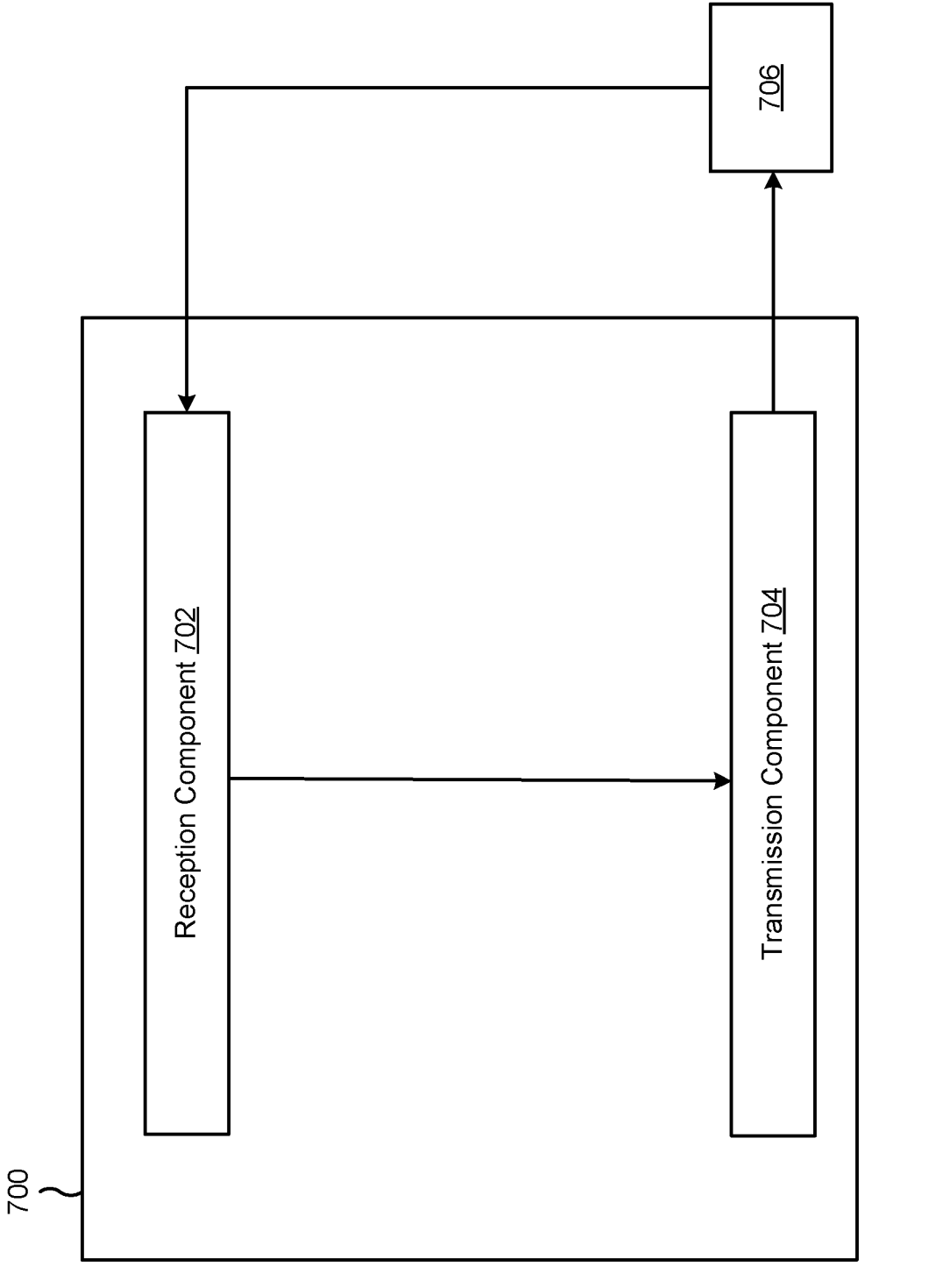

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The transmission component 704 may transmit, to a UE, an indication of an uplink power control parameter indication scheme associated with an uplink channel or a reference signal, wherein the uplink power control indication scheme is associated with a setting of one or more uplink power control parameters for the uplink channel or the reference signal in relation to an uplink TCI state or a joint TCI state. The transmission component 704 may transmit, to the UE, the one or more uplink power control parameters based at least in part on the indication of the uplink power control parameter indication scheme associated with the uplink channel or the reference signal. The reception component 702 may receive, from the UE, a capability report that indicates a support of uplink power control parameter indication schemes for different uplink channels or reference signals.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, from a base station, an indication of an uplink power control parameter indication scheme associated with an uplink channel or a reference signal, wherein the uplink power control indication scheme is associated with a setting of one or more uplink power control parameters for the uplink channel or the reference signal in relation to an uplink transmission configuration indicator (TCI) state or a joint TCI state: and receiving, from the base station, the one or more uplink power control parameters based at least in part on the indication of the uplink power control parameter indication scheme associated with the uplink channel or the reference signal.

Aspect 2: The method of Aspect 1, wherein the one or more uplink power control parameters include a $P_0$ value associated with a received power level, an alpha value associated with a partial pathloss compensation, and a closed loop index associated with a transmit power control command.

Aspect 3: The method of any of Aspects 1 through 2, wherein the one or more uplink power control parameters include a pathloss reference signal.

Aspect 4: The method of any of Aspects 1 through 3, wherein the setting of the one or more uplink power control parameters is associated with or included with the uplink TCI state or the joint TCI state, wherein the uplink channel is a physical uplink control channel or a physical uplink shared channel.

Aspect 5: The method of any of Aspects 1 through 4, wherein the reference signal is a sounding reference signal (SRS), and wherein the setting of the one or more uplink power control parameters is configured per SRS resource set and is not associated with or included with the uplink TCI state or the joint TCI state for each SRS in an SRS resource set.

Aspect 6: The method of any of Aspects 1 through 5, wherein the reference signal is a sounding reference signal (SRS), and wherein the setting of the one or more uplink power control parameters is associated with or included with the uplink TCI state or the joint TCI state for an SRS resource.

Aspect 7: The method of Aspect 6, wherein uplink power control parameter sets associated with different TCIs for different SRS resources per SRS resource set are a same uplink power control parameter set.

Aspect 8: The method of Aspect 6, wherein an uplink power control parameter set is configured for a single TCI of a single SRS resource per SRS resource set, and other SRS resources are associated with the uplink power control parameter set.

Aspect 9: The method of any of Aspects 1 through 8, further comprising: transmitting, to the base station, a capability report that indicates a support of uplink power control parameter indication schemes for different uplink channels or reference signals, wherein the uplink channels include a physical uplink control channel or a physical uplink shared channel and the reference signals include a sounding reference signal, wherein the indication of the uplink power control parameter indication scheme received from the base station is based at least in part on the capability report.

Aspect 10: The method of Aspect 9, wherein the capability report indicates that: the UE supports the setting of the one or more uplink power control parameters being included with the uplink TCI state or the joint TCI state: the UE supports the setting of the one or more uplink power control parameters being associated with the uplink TCI state or the joint TCI state: or the UE supports the setting of the one or more uplink power control parameters neither being associated with nor included with the uplink TCI state or the joint TCI state, and wherein the one or more uplink power control parameters include a $P_0$ value associated with a received power level, an alpha value associated with a partial pathloss compensation, and a closed loop index associated with a transmit power control command.

Aspect 11: The method of Aspect 9, wherein the capability report indicates that: the UE supports the setting of the one or more uplink power control parameters being included with the uplink TCI state or the joint TCI state: the UE supports the setting of the one or more uplink power control parameters being associated with the uplink TCI state or the joint TCI state; or the UE supports the setting of the one or more uplink power control parameters neither being associated with nor included with the uplink TCI state or the joint TCI state, and wherein the one or more uplink power control parameters include a pathloss reference signal.

Aspect 12: The method of any of Aspects 1 through 11, wherein the indication of the uplink power control parameter indication scheme is received from the base station in a radio resource control (RRC) configuration, wherein the RRC configuration indicates respective uplink power control parameter indication schemes for each of a plurality of uplink channels or reference signals.

Aspect 13: The method of any of Aspects 1 through 12, wherein the setting of the one or more uplink power control parameters is neither associated with nor included with the uplink TCI state or the joint TCI state when the UE is not configured or enabled with the setting of the one or more uplink power control parameters to be associated with or included with the uplink TCI state or the joint TCI state.

Aspect 14: The method of any of Aspects 1 through 13, further comprising: calculating a pathloss based at least in part on a periodic downlink reference signal configured as a source reference signal for determining a spatial transmit filter in the uplink TCI state or the joint TCI state, wherein the setting of the one or more uplink power control parameters does not configure or enable the UE to have a pathloss reference signal associated with or included with the uplink TCI state or the joint TCI state.

Aspect 15: The method of Aspect 14, wherein a quasi-colocation reference signal is periodic when the pathloss is calculated based at least in part on the periodic downlink reference signal.

Aspect 16: The method of Aspect 14, wherein a quasi-colocation (QCL) reference signal is not periodic when the pathloss is calculated based at least in part on the periodic downlink reference signal, wherein a pathloss reference signal is associated with or included with the uplink TCI state or the joint TCI state, or wherein at least one QCL reference signal is periodic in a QCL chain and the UE uses an immediate parent source reference signal that is periodic.

Aspect 17: A method of wireless communication performed by a base station, comprising: transmitting, to a user equipment (UE), an indication of an uplink power control parameter indication scheme associated with an uplink channel or a reference signal, wherein the uplink power control indication scheme is associated with a setting of one or more uplink power control parameters for the uplink channel or the reference signal in relation to an uplink transmission configuration indicator (TCI) state or a joint TCI state; and transmitting, to the UE, the one or more uplink power control parameters based at least in part on the indication of the uplink power control parameter indication scheme associated with the uplink channel or the reference signal.

Aspect 18: The method of Aspect 17, wherein the one or more uplink power control parameters include a $P_0$ value associated with a received power level, an alpha value associated with a partial pathloss compensation, and a closed loop index associated with a transmit power control command.

Aspect 19: The method of any of Aspects 17 through 18, wherein the one or more uplink power control parameters include a pathloss reference signal.

Aspect 20: The method of any of Aspects 17 through 19, wherein the setting of the one or more uplink power control parameters is associated with or included with the uplink TCI state or the joint TCI state, wherein the uplink channel is a physical uplink control channel or a physical uplink shared channel.

Aspect 21: The method of any of Aspects 17 through 20, wherein the reference signal is a sounding reference signal (SRS), and wherein the setting of the one or more uplink power control parameters is configured per SRS resource set and is not associated with or included with the uplink TCI state or the joint TCI state for each SRS in an SRS resource set.

Aspect 22: The method of any of Aspects 17 through 21, wherein the reference signal is a sounding reference signal (SRS), and wherein the setting of the one or more uplink power control parameters is associated with or included with the uplink TCI state or the joint TCI state for an SRS resource.

Aspect 23: The method of Aspect 22, wherein uplink power control parameter sets associated with different TCIs for different SRS resources per SRS resource set are a same uplink power control parameter set.

Aspect 24: The method of Aspect 22, wherein an uplink power control parameter set is configured for a single TCI of a single SRS resource per SRS resource set, and other SRS resources are associated with the uplink power control parameter set.

Aspect 25: The method of any of Aspects 17 through 24, further comprising: receiving, from the UE, a capability report that indicates a support of uplink power control parameter indication schemes for different uplink channels or reference signals, wherein the uplink channels include a physical uplink control channel or a physical uplink shared channel and the reference signals include a sounding reference signal, wherein the indication of the uplink power control parameter indication scheme received from the base station is based at least in part on the capability report.

Aspect 26: The method of Aspect 25, wherein the capability report indicates that: the UE supports the setting of the one or more uplink power control parameters being included with the uplink TCI state or the joint TCI state: the UE supports the setting of the one or more uplink power control parameters being associated with the uplink TCI state or the joint TCI state: or the UE supports the setting of the one or more uplink power control parameters neither being associated with nor included with the uplink TCI state or the joint TCI state, and wherein the one or more uplink power control parameters include a $P_0$ value associated with a received power level, an alpha value associated with a partial pathloss compensation, and a closed loop index associated with a transmit power control command.

Aspect 27: The method of Aspect 25, wherein the capability report indicates that: the UE supports the setting of the one or more uplink power control parameters being included with the uplink TCI state or the joint TCI state: the UE supports the setting of the one or more uplink power control parameters being associated with the uplink TCI state or the joint TCI state: or the UE supports the setting of the one or more uplink power control parameters neither being associated with nor included with the uplink TCI state or the joint TCI state, and wherein the one or more uplink power control parameters include a pathloss reference signal.

Aspect 28: The method of any of Aspects 17 through 27, wherein the indication of the uplink power control parameter indication scheme is received from the base station in a radio resource control (RRC) configuration, wherein the RRC configuration indicates respective uplink power control parameter indication schemes for each of a plurality of uplink channels or reference signals.

Aspect 29: The method of any of Aspects 17 through 28, wherein the setting of the one or more uplink power control parameters is neither associated with nor included with the uplink TCI state or the joint TCI state when the UE is not configured or enabled with the setting of the one or more uplink power control parameters to be associated with or included with the uplink TCI state or the joint TCI state.

Aspect 30: An apparatus for wireless communication at a device, comprising a processor: memory coupled with the processor: and instructions stored in the memory and executable by the processor to cause the apparatus to perform the method of one or more of 1-16.

Aspect 31: A device for wireless communication, comprising a memory and one or more processors coupled to the memory, the one or more processors configured to perform the method of one or more of 1-16.

Aspect 32: An apparatus for wireless communication, comprising at least one means for performing the method of one or more of 1-16.

Aspect 33: A non-transitory computer-readable medium storing code for wireless communication, the code comprising instructions executable by a processor to perform the method of one or more of 1-16.

Aspect 34: A non-transitory computer-readable medium storing a set of instructions for wireless communication, the set of instructions comprising one or more instructions that, when executed by one or more processors of a device, cause the device to perform the method of one or more of 1-16.

Aspect 35: An apparatus for wireless communication at a device, comprising a processor: memory coupled with the processor: and instructions stored in the memory and executable by the processor to cause the apparatus to perform the method of one or more of 17-29.

Aspect 36: A device for wireless communication, comprising a memory and one or more processors coupled to the memory, the one or more processors configured to perform the method of one or more of 17-29.

Aspect 37: An apparatus for wireless communication, comprising at least one means for performing the method of one or more of 17-29.

Aspect 38: A non-transitory computer-readable medium storing code for wireless communication, the code comprising instructions executable by a processor to perform the method of one or more of 17-29.

Aspect 39: A non-transitory computer-readable medium storing a set of instructions for wireless communication, the set of instructions comprising one or more instructions that, when executed by one or more processors of a device, cause the device to perform the method of one or more of 17-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more antennas; and one or more processors and a memory coupled with the one or more processors, the one or more processors configured to cause the UE to:

receive, from a base station, an uplink power control parameter indication scheme associated with an uplink channel or a reference signal, wherein the uplink power control parameter indication scheme is associated with a setting of one or more uplink power control parameters for the uplink channel or the reference signal in relation to an uplink transmission configuration indicator (TCI) state or a joint TCI state; and receive, from the base station, the one or more uplink power control parameters based at least in part on the uplink power control parameter indication scheme associated with the uplink channel or the reference signal.

2. The UE of claim 1, wherein the one or more uplink power control parameters include a $P_0$ value associated with a received power level, an alpha value associated with a partial pathloss compensation, and a closed loop index associated with a transmit power control command.

3. The UE of claim 1, wherein the one or more uplink power control parameters include a pathloss reference signal.

4. The UE of claim 1, wherein the setting of the one or more uplink power control parameters is associated with or included with the uplink TCI state or the joint TCI state, wherein the uplink channel is a physical uplink control channel or a physical uplink shared channel.

5. The UE of claim 1, wherein the reference signal is a sounding reference signal (SRS), and wherein the setting of the one or more uplink power control parameters is configured per SRS resource set and is not associated with or included with the uplink TCI state or the joint TCI state for each SRS in an SRS resource set.

6. The UE of claim 1, wherein the reference signal is a sounding reference signal (SRS), and wherein the setting of the one or more uplink power control parameters is associated with or included with the uplink TCI state or the joint TCI state for an SRS resource.

7. The UE of claim 6, wherein uplink power control parameter sets associated with different TCIs for different SRS resources per SRS resource set are a same uplink power control parameter set.

8. The UE of claim 6, wherein an uplink power control parameter set is configured for a single TCI of a single SRS resource per SRS resource set, and other SRS resources are associated with the uplink power control parameter set.

9. The UE of claim 1, wherein the one or more processors are further configured to cause the UE to:
  transmit, to the base station, a capability report that indicates a support of uplink power control parameter indication schemes for uplink channels or reference signals, wherein the uplink channels include a physical uplink control channel or a physical uplink shared channel and the reference signals include a sounding reference signal, wherein the uplink power control parameter indication scheme is based at least in part on the capability report.

10. The UE of claim 9, wherein the capability report indicates that:
  the UE supports the setting of the one or more uplink power control parameters being included with the uplink TCI state or the joint TCI state;
  the UE supports the setting of the one or more uplink power control parameters being associated with the uplink TCI state or the joint TCI state; or
  the UE supports the setting of the one or more uplink power control parameters neither being associated with nor included with the uplink TCI state or the joint TCI state, and wherein the one or more uplink power control parameters include a $P_0$ value associated with a received power level, an alpha value associated with a partial pathloss compensation, and a closed loop index associated with a transmit power control command.

11. The UE of claim 9, wherein the capability report indicates that:
  the UE supports the setting of the one or more uplink power control parameters being included with the uplink TCI state or the joint TCI state;
  the UE supports the setting of the one or more uplink power control parameters being associated with the uplink TCI state or the joint TCI state; or
  the UE supports the setting of the one or more uplink power control parameters neither being associated with nor included with the uplink TCI state or the joint TCI state, and wherein the one or more uplink power control parameters include a pathloss reference signal.

12. The UE of claim 1, wherein the one or more processors, to cause the UE to receive the uplink power control parameter indication scheme, is configured to cause the UE to:
  receive the uplink power control parameter indication scheme in a radio resource control (RRC) configuration, wherein the RRC configuration indicates respective uplink power control parameter indication schemes for each of a plurality of uplink channels or reference signals.

13. The UE of claim 1, wherein the setting of the one or more uplink power control parameters is neither associated with nor included with the uplink TCI state or the joint TCI state when the UE is not configured or enabled with the setting of the one or more uplink power control parameters to be associated with or included with the uplink TCI state or the joint TCI state.

14. The UE of claim 1, wherein the one or more processors are further configured to cause the UE to:
  calculate a pathloss based at least in part on a periodic downlink reference signal configured as a source reference signal for determining a spatial transmit filter in the uplink TCI state or the joint TCI state, wherein the setting of the one or more uplink power control parameters does not configure or enable the UE to have a pathloss reference signal associated with or included with the uplink TCI state or the joint TCI state.

15. The UE of claim 14, wherein a quasi-colocation reference signal is periodic when the pathloss is calculated based at least in part on the periodic downlink reference signal.

16. The UE of claim 14, wherein a quasi-colocation (QCL) reference signal is not periodic when the pathloss is calculated based at least in part on the periodic downlink reference signal, wherein a pathloss reference signal is associated with or included with the uplink TCI state or the joint TCI state, or wherein at least one QCL reference signal is periodic in a QCL chain and the UE uses an immediate parent source reference signal that is periodic.

17. A base station for wireless communication, comprising:
  one or more antennas; and
  one or more processors, and a memory coupled with the one or more processors, the one or more processors configured to cause the base station to:
    transmit, to a user equipment (UE), an uplink power control parameter indication scheme associated with an uplink channel or a reference signal, wherein the uplink power control parameter indication scheme is associated with a setting of one or more uplink power control parameters for the uplink channel or the reference signal in relation to an uplink transmission configuration indicator (TCI) state or a joint TCI state; and
    transmit, to the UE, the one or more uplink power control parameters based at least in part on the uplink power control parameter indication scheme associated with the uplink channel or the reference signal.

18. The base station of claim 17, wherein the one or more uplink power control parameters include a $P_0$ value associated with a received power level, an alpha value associated with a partial pathloss compensation, and a closed loop index associated with a transmit power control command.

19. The base station of claim 17, wherein the one or more uplink power control parameters include a pathloss reference signal.

20. The base station of claim 17, wherein the setting of the one or more uplink power control parameters is associated with or included with the uplink TCI state or the joint TCI state, wherein the uplink channel is a physical uplink control channel or a physical uplink shared channel.

21. The base station of claim 17, wherein the reference signal is a sounding reference signal (SRS), and wherein the setting of the one or more uplink power control parameters is configured per SRS resource set and is not associated with or included with the uplink TCI state or the joint TCI state for each SRS in an SRS resource set.

22. The base station of claim 17, wherein the reference signal is a sounding reference signal (SRS), and wherein the setting of the one or more uplink power control parameters is associated with or included with the uplink TCI state or the joint TCI state for an SRS resource.

23. The base station of claim 22, wherein uplink power control parameter sets associated with different TCIs for different SRS resources per SRS resource set are a same uplink power control parameter set.

24. The base station of claim 22, wherein an uplink power control parameter set is configured for a single TCI of a single SRS resource per SRS resource set, and other SRS resources are associated with the uplink power control parameter set.

25. The base station of claim 17, wherein the one or more processors are further configured to cause the base station to:

receive, from the UE, a capability report that indicates a support of uplink power control parameter indication schemes for uplink channels or reference signals, wherein the uplink channels include a physical uplink control channel or a physical uplink shared channel and the reference signals include a sounding reference signal, wherein the uplink power control parameter indication scheme is based at least in part on the capability report.

26. The base station of claim 25, wherein the capability report indicates that:

the UE supports the setting of the one or more uplink power control parameters being included with the uplink TCI state or the joint TCI state;

the UE supports the setting of the one or more uplink power control parameters being associated with the uplink TCI state or the joint TCI state; or the UE supports the setting of the one or more uplink power control parameters neither being associated with nor included with the uplink TCI state or the joint TCI state, and wherein the one or more uplink power control parameters include a $P_0$ value associated with a received power level, an alpha value associated with a partial pathloss compensation, and a closed loop index associated with a transmit power control command.

27. The base station of claim 25, wherein the capability report indicates that:

the UE supports the setting of the one or more uplink power control parameters being included with the uplink TCI state or the joint TCI state;

the UE supports the setting of the one or more uplink power control parameters being associated with the uplink TCI state or the joint TCI state; or the UE supports the setting of the one or more uplink power control parameters neither being associated with nor included with the uplink TCI state or the joint TCI state, and wherein the one or more uplink power control parameters include a pathloss reference signal.

28. The base station of claim 17, wherein the one or more processors, to cause the base station to transmit the uplink power control parameter indication scheme, is configured to cause the base station to:

transmit the uplink power control parameter indication scheme in a radio resource control (RRC) configuration, wherein the RRC configuration indicates respective uplink power control parameter indication schemes for each of a plurality of uplink channels or reference signals.

29. The base station of claim 17, wherein the setting of the one or more uplink power control parameters is neither associated with nor included with the uplink TCI state or the joint TCI state when the UE is not configured or enabled with the setting of the one or more uplink power control parameters to be associated with or included with the uplink TCI state or the joint TCI state.

30. A method of wireless communication performed by a user equipment (UE), comprising:

receiving, from a base station, an uplink power control parameter indication scheme associated with an uplink channel or a reference signal, wherein the uplink power control parameter indication scheme is associated with a setting of one or more uplink power control parameters for the uplink channel or the reference signal in relation to an uplink transmission configuration indicator (TCI) state or a joint TCI state; and receiving, from the base station, the one or more uplink power control parameters based at least in part on the uplink power control parameter indication scheme associated with the uplink channel or the reference signal.

31. The method of claim 30, wherein the one or more uplink power control parameters include a $P_0$ value associated with a received power level, an alpha value associated with a partial pathloss compensation, and a closed loop index associated with a transmit power control command.

32. The method of claim 30, wherein the one or more uplink power control parameters include a pathloss reference signal.

33. The method of claim 30, wherein the setting of the one or more uplink power control parameters is associated with or included with the uplink TCI state or the joint TCI state, wherein the uplink channel is a physical uplink control channel or a physical uplink shared channel.

34. A method of wireless communication performed by a base station, comprising:

transmitting, to a user equipment (UE), an uplink power control parameter indication scheme associated with an uplink channel or a reference signal, wherein the uplink power control parameter indication scheme is associated with a setting of one or more uplink power control parameters for the uplink channel or the reference signal in relation to an uplink transmission configuration indicator (TCI) state or a joint TCI state; and transmitting, to the UE, the one or more uplink power control parameters based at least in part on the uplink power control parameter indication scheme associated with the uplink channel or the reference signal.

35. A non-transitory computer-readable medium storing a set of instructions for wireless communication, the set of instructions comprising:

one or more instructions that, when executed by one or more processors of a user equipment (UE), cause the UE to:

receive, from a base station, an uplink power control parameter indication scheme associated with an uplink channel or a reference signal, wherein the uplink power control parameter indication scheme is associated with a setting of one or more uplink power control parameters for the uplink channel or the reference signal in relation to an uplink transmission configuration indicator (TCI) state or a joint TCI state; and receive, from the base station, the one or more uplink power control parameters based at least in part on the uplink power control parameter indication scheme associated with the uplink channel or the reference signal.

* * * * *